United States Patent

Kurby et al.

[11] Patent Number: 5,930,268
[45] Date of Patent: Jul. 27, 1999

[54] TRANSCEIVER AND ASSOCIATED METHOD FOR SURVIVING FADES

[75] Inventors: Christopher Neil Kurby, Elmhurst; John William Arens, Grayslake; Kathleen Helen Ryan, Palatine, all of Ill.

[73] Assignee: Motorola, Inc., Schaumburg, Ill.

[21] Appl. No.: 08/771,597

[22] Filed: Dec. 20, 1996

[51] Int. Cl.⁶ ...................................... H04J 3/06
[52] U.S. Cl. .......................................... 370/509; 375/357
[58] Field of Search ...................... 370/503, 504, 370/505, 506, 507, 508, 509, 510, 511, 512, 513, 514, 515, 516, 517, 518, 519, 520, 350, 321, 337, 347, 442, 311; 375/354, 356, 357, 358, 362, 365, 368; 340/825.14; 455/502, 504, 505, 506, 511, 515, 517, 526, 67.1, 343, 10, 67.3

[56] References Cited

U.S. PATENT DOCUMENTS 4,768,032  8/1988  Sharpe et al. .................. 340/825.47
5,594,943  1/1997  Balachandran .
5,678,227  10/1997  Connell et al. ..................... 370/311
5,764,648  6/1998  Yamane et al. ..................... 370/350

*Primary Examiner*—Huy D. Vu
*Attorney, Agent, or Firm*—Daniel W. Juffernbruch; Richard K. Clark

[57] ABSTRACT

A time-framed communications transceiver maintains synchronization through fade conditions by resetting a counter (640) whenever new synchronization parameters are stored in a memory (630) based on bursts detected by a receiver (610) and a burst synchronizer (620). A transmitter (690) transmits bursts based upon the synchronization parameters in the memory (630) when the time counter (640) has not exceeded a predetermined period of time. The receiver (610) re-establishes the synchronization parameters in the memory (630) when the time counter exceeds another, longer predetermined period of time before transmission by the transmitter (690).

17 Claims, 3 Drawing Sheets

TRANSCEIVER AND ASSOCIATED METHOD FOR SURVIVING FADES

BACKGROUND OF THE INVENTION

1. Technical Field

This invention relates to transceivers and, more particularly, relates to transceivers capable of handling fade conditions.

2. Description of the Related Art

A transceiver 110 such as a mobile transceiver communicates with a remote station 210. As the mobile transceiver 110 changes its position with respect to the remote station 210, obstructions such as buildings 310, 320 and foliage 330, as well as other obstructions such as mountains and hills, will affect transmission of a radio signal between the remote station 210 and the transceiver 110. These obstructions 310, 320 and 330 can cause a disturbance in the signal transmitted between the remote station 210 and the transceiver 110. This disturbance in the communication between the remote station 210 and the transceiver 110 can be very short, causing a short fade of less than about 10 milliseconds, or can be longer on the order of one or more seconds causing a long fade or shadow.

Although short fades affect transmission quality, longer fades and shadows can cause permanent loss of communication and a call to be dropped.

BRIEF DESCRIPTION OF THE DRAWINGS

The above and other problems are solved by the inventions herein as described below with respect to the accompanying drawings wherein.

DESCRIPTION OF THE PREFERRED EMBODIMENTS

Figure 1:
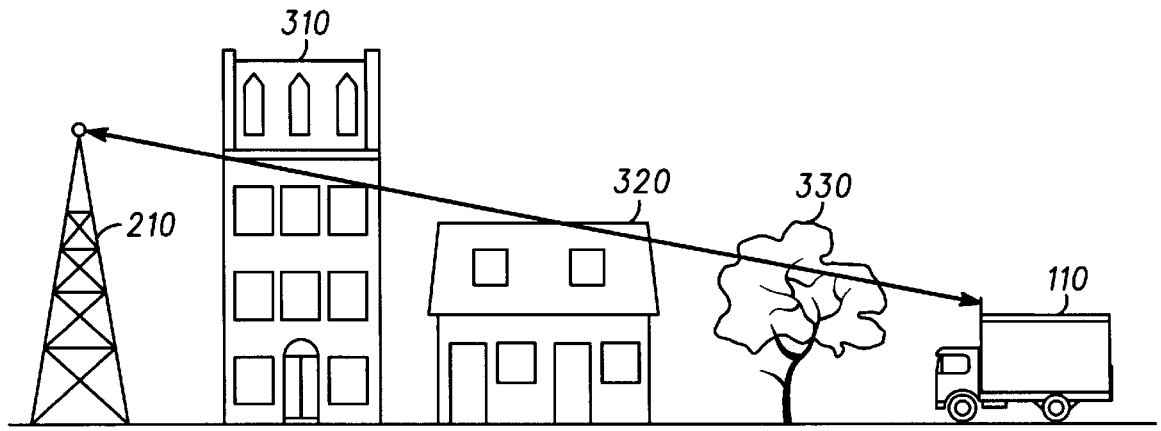
FIG. 1 is an illustration of an operating environment for communication between a transceiver and a remote station.

Digital or time-framed communication systems, such as those having frames created by time division multiple access (TDMA), are sensitive to drift in accuracy in the timing of frame arrival between the transceiver 110 and the remote station 210 and the respective frequencies of the transceiver 110 and the transceiver at the remote station 210. A time-framed spread spectrum type code division multiple access (CDMA) system is a form of a time division multiple access (TDMA) system sensitive to frame arrival time and other timings. In the above systems, the transceiver 110 and the transceiver at the remote station 210 from time to time may require communication with one another to reset synchronization parameters such as, for example, timing and frequency.

In a system where transceivers 110 move rapidly with respect to a remote station 210, such as transceivers in fast moving vehicles, aircraft or satellites, for example, changes in timing and frequency occur more rapidly than in systems where the transceiver 110 and the remote station 210 move slowly with respect to one another. In such systems where transceivers move at high velocities, during a long fade or shadow, the transceiver 110 and the transceiver of the remote station 210 cannot communicate to update synchronization parameters, and after a given period of time, the remote station 210 of a system may abandon communication with the apparently lost transceiver 110.

When a receiver of a time-frame communications transceiver receives bursts that are detectable, the synchronization parameters are extracted from the burst and used for subsequent communications. The transceiver of the present invention keeps track of an amount of time elapsed since detection of the latest burst and thus knows how long it has been since the synchronization parameters were derived. The transceiver 110 and the transceiver of the remote station 210 wait to communicate with each other again to set new synchronization parameters. But if a long fade or shadow interrupts communication between the transceiver 110 and the remote station 210, the mobile transceiver 110 in the remote station 210 cannot establish a link during the fade or shadow. If, during the fade or shadow, a burst is undetectable, for no more than a predetermined short time period indicative of the length of time in which an intolerable amount of variation would cause loss of synchronization with a transmitter of the remote station 210, then the mobile transceiver 110 can transmit a transmit burst to the remote station 210 under the assumption that the synchronization parameters have not drifted too much. This predetermined short time period is in the preferred embodiment is approximately 1.8 seconds for a low earth orbit TDMA satellite voice communication system. Nevertheless, if the burst is undetectable longer than the predetermined short time period indicative of the length of time the variation in synchronization parameters would cause loss of synchronization with a receiver of the remote station 210, then the transmitter 690 ceases transmission. In the exemplary communication system, constraints on the receiver can be chosen by the design of the communication system to be the same, more or less tolerant to drift in the synchronization parameters than the transmitter 690. When the receiver 610 is chosen to be less tolerant to drift in the synchronization parameters, the transmitter 690 can continue to look for detectable bursts after the predetermined short time period.

At a predetermined long time period after detection of the last burst where an intolerable amount of variation in the synchronization parameters such as frequency and frame arrival timing would cause loss of synchronization with the transmitter of the remote station 210, then the receiver 610 and the burst synchronizer 620 detect a broadcast frame in the broadcast channel. This predetermined long time period in the preferred embodiment is approximately 8 seconds for a low earth orbit TDMA satellite voice communication system. Resorting to the broadcast frame on the broadcast channel, however, will seriously interrupt communication of traffic data or voice and thus should be considered a last resort. Prior to the predetermined long period of time, the mobile transceiver 110 continually checks for receipt of a detectable burst.

Figure 2:
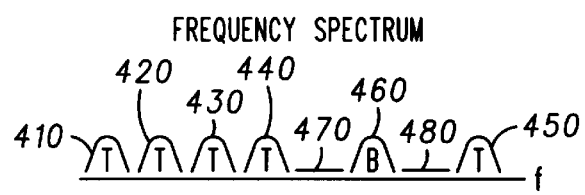
FIG. 2 is an illustration of the frequency spectrum in a exemplary system.

FIG. 2 illustrates the frequency spectrum in an exemplary TDMA communication system having many traffic channels, e.g., 410, 420, 430, 440 and 450, and a broadcast channel 460. Each of the traffic channels, for example, 410, is time divided and contains a plurality of traffic frames. The broadcast channel 460 is also time divided and contains a plurality of broadcast frames. Wide guard bands 470 and 480 are provided between the broadcast channel 460 and adjacent channels such as the traffic channels 440 and 450. These wide guard bands 470 and 480 reduce adjacent channel interference in a broadcast channel receiver to make a burst in a broadcast channel easier to detect by reducing adjacent channel interference.

Figure 3:
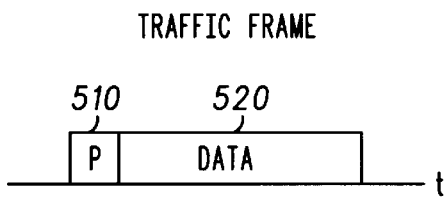
FIG. 3 is an illustration of a traffic frame in an exemplary system.
Figure 4:
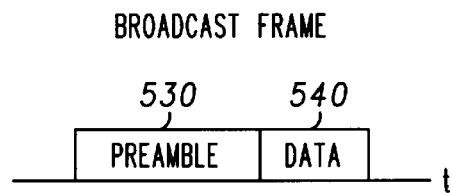
FIG. 4 is an illustration of a broadcast frame in an exemplary system.

FIGS. 3 and 4 respectively illustrate a traffic frame and a broadcast frame in the exemplary TDMA communications system. The traffic frame has a small preamble portion 510 and a large data portion 520 while the broadcast frame has a large preamble portion 530 and a small data portion 540. The preamble portion 510 of the traffic frame of FIG. 3 assists in setting of new synchronization parameters once old synchronization parameters have been adequately established during communication of large amounts of traffic data 520. On the other hand, the large preamble 530 of the broadcast frame provides for initial synchronization and establishment of the synchronization parameters before traffic data communication can commence. The broadcast frame is however provides for easier detection of a burst containing the broadcast frame because of the larger preamble portion 530. Because in the exemplary communication system, such as in most TDMA systems, the frames have the same nominal length, the data portion 540 of the broadcast frame is much smaller than the preamble portion 530. The data portion 540 of the broadcast frame can communicate subsequent traffic channel assignments to a subscriber transceiver from the remote station transceiver. Because the broadcast frames in the broadcast channel 460 convey less data and consume more spectrum than the traffic frames in the traffic channels 410, due to the required guard bands 470 and 480, the communication of data traffic on traffic frames is preferred to maximize data throughput while conserving spectrum. Then resort to the broadcast frame after initial synchronization parameters have been established is undesirable. Should resort to the broadcast frame be necessary during communication after initial synchronization parameters have been established, noticeable interruptions in traffic data such as voice communication or even complete termination of the communication or call may undesirably occur. The present invention continues synchronized communication handshake between a subscriber transceiver and a remote station transceiver even during long fades or shadows by reliance on traffic frames without resort to the broadcast frame. The broadcast frame is however if a long period of time has elapsed since adoption of synchronization parameters from a detectable burst in a way early enough that dropping of a call is still avoided.

Figure 5:
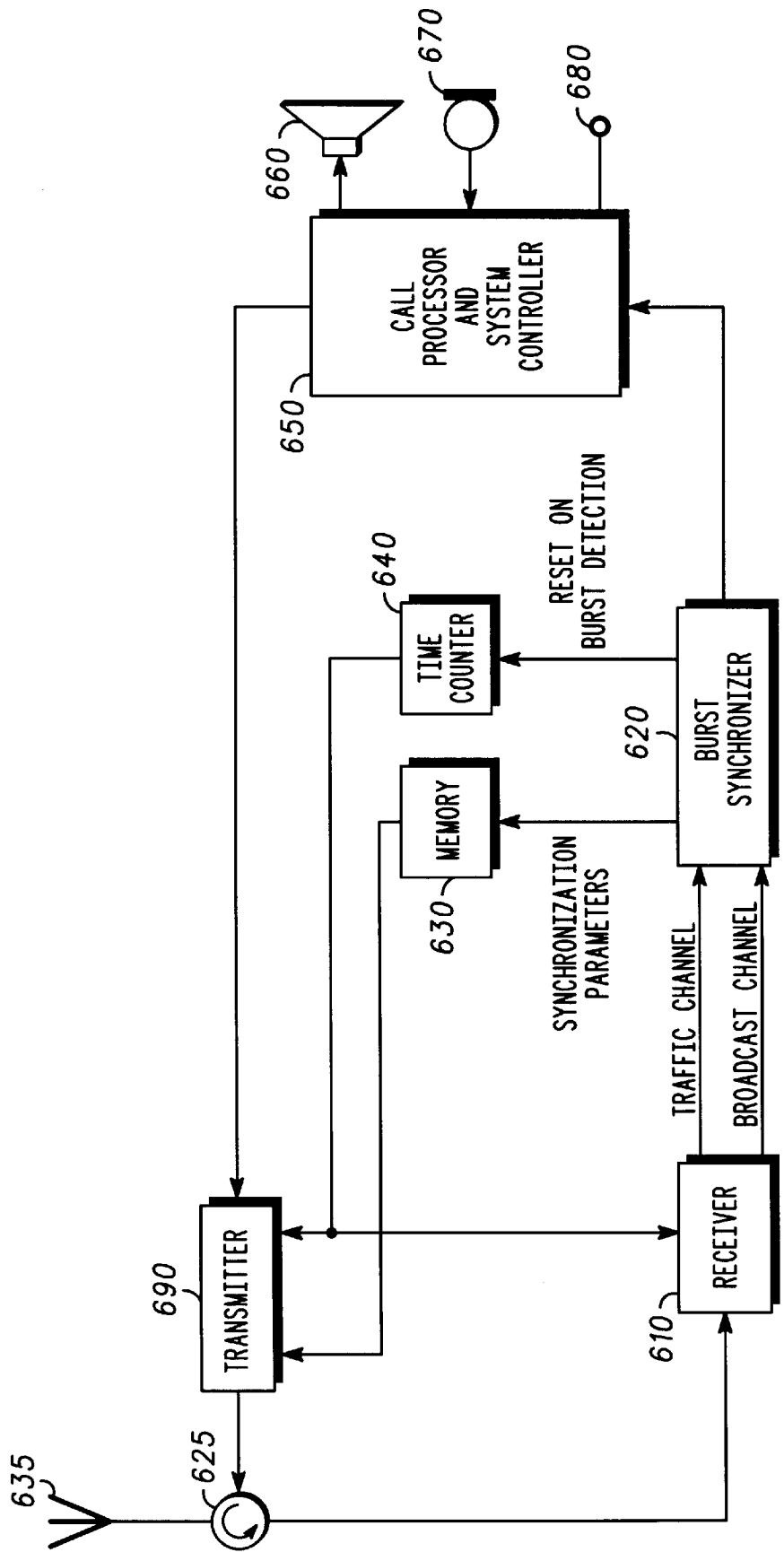
FIG. 5 is a schematic block diagram of a transceiver for surviving fade conditions.

FIG. 5 illustrates a schematic block diagram of a transceiver for communication with a transceiver at a base station or satellite. A receiver 610 is connected via a circulator 625 to an antenna 635 to receive bursts on broadcast and traffic channels. A burst synchronizer 620 compares the preamble of a received burst to a desired burst using, for example, finite impulse response (FIR) filters, to determine if a burst is detectable. If the burst is detectable, the burst synchronizer 620 extracts synchronization parameters from the burst and stores the synchronization parameters in a memory 630. Additionally, when the burst synchronizer 620 detects a burst, a time counter 640 is reset. Thereafter, the time counter counts from the beginning of the detection of a burst to determine an amount of time or clock cycles elapsed since detection of the last burst. The counter 640 thus counts either time in units of seconds or otherwise or counts events such as clock cycles; the counter 640 thus represents time elapsed with respect to the timing of the system or timing on a clock, as in seconds. Nevertheless, the burst synchronizer 620 still checks, on an intermittent basis, for detectable bursts on the traffic channel.

When the transceiver is initially powered up for communication with a transceiver at a base station or a satellite, the burst synchronizer 620 seeks to detect a burst on the broadcast channel. Once a burst is detected on the broadcast channel, the synchronization parameters are stored in the memory 630 and the time counter 640 is reset. Thereafter, when traffic frames are detected on the traffic channel, the burst synchronizer updates the synchronization parameters in memory 630, resets the time counter 640, and sends traffic data to the call processor and system controller 650 for voice communication with a user via speaker 660 and microphone 670 for voice traffic data. When the traffic data represents non-voice data such as image, e-mail, etc., then an external interface such as bus connector 680 is utilized by the call processor and system controller 650.

The transceiver in the base station or satellite and the subscriber transceiver periodically need to link with one another to establish the synchronization parameters and confirm synchronization has been established. Time-frame communications systems thus require that a transmitter such as the transmitter 690 in FIG. 5 transmit a burst on a traffic channel at least once after a defined interval of inactivity containing voice data or at least a transmit burst for maintenance purposes. During a fade or shadow condition, the transceiver of FIG. 5 will still attempt to transmit bursts based on previous synchronization parameters stored in the memory 630 so long as the time on the time counter 640 has not reached a predetermined short time period where an intolerable amount of variation in synchronization parameters such as frequency and frame arrival time, would cause loss of synchronization of the transmitter of the transceiver with the receiver of a remote station such as the satellite or base station. As the transmitter 690 sends bursts, the synchronization parameters in the memory 630 will be updated whenever the burst synchronizer 620 successfully detects a burst. The transmitter 690 then references time counter 640 to determine whether the time that the synchronization parameters were in memory 630 is below a predetermined short time period and therefore assumed to still be acceptable for transmission.

If the count in the time counter 640 is greater than the predetermined short time period, then the transmitter 690 ceases transmission of bursts until the time counter is reset upon detection of another burst and determination and storage of new synchronization parameters in the memory 630. Should the time counter 640 be reset, then the transmitter 690 immediately transmits its next assembled burst based on the new synchronization parameters in the memory 630. It is assumed that during the time between the short period of time and the long period of time that there is a likelihood of still receiving a burst on the traffic channel to update synchronization parameters.

Should the time indicated by the time counter 640 reach a predetermined long time period indicative of when an intolerable amount of variation in the synchronization parameters, such as frame arrival time and frequency, would cause loss of synchronization with a transmitter of the remote station, then the receiver 610 receives a burst on the broadcast channel, re-establishes synchronization parameters, stores the re-established synchronization parameters in the memory 630 and resets the time counter 640. Thereafter, the transmitter 690 can transmit the next assembled burst based on when the time counter is reset based on the re-established synchronization parameters.

Figure 6:
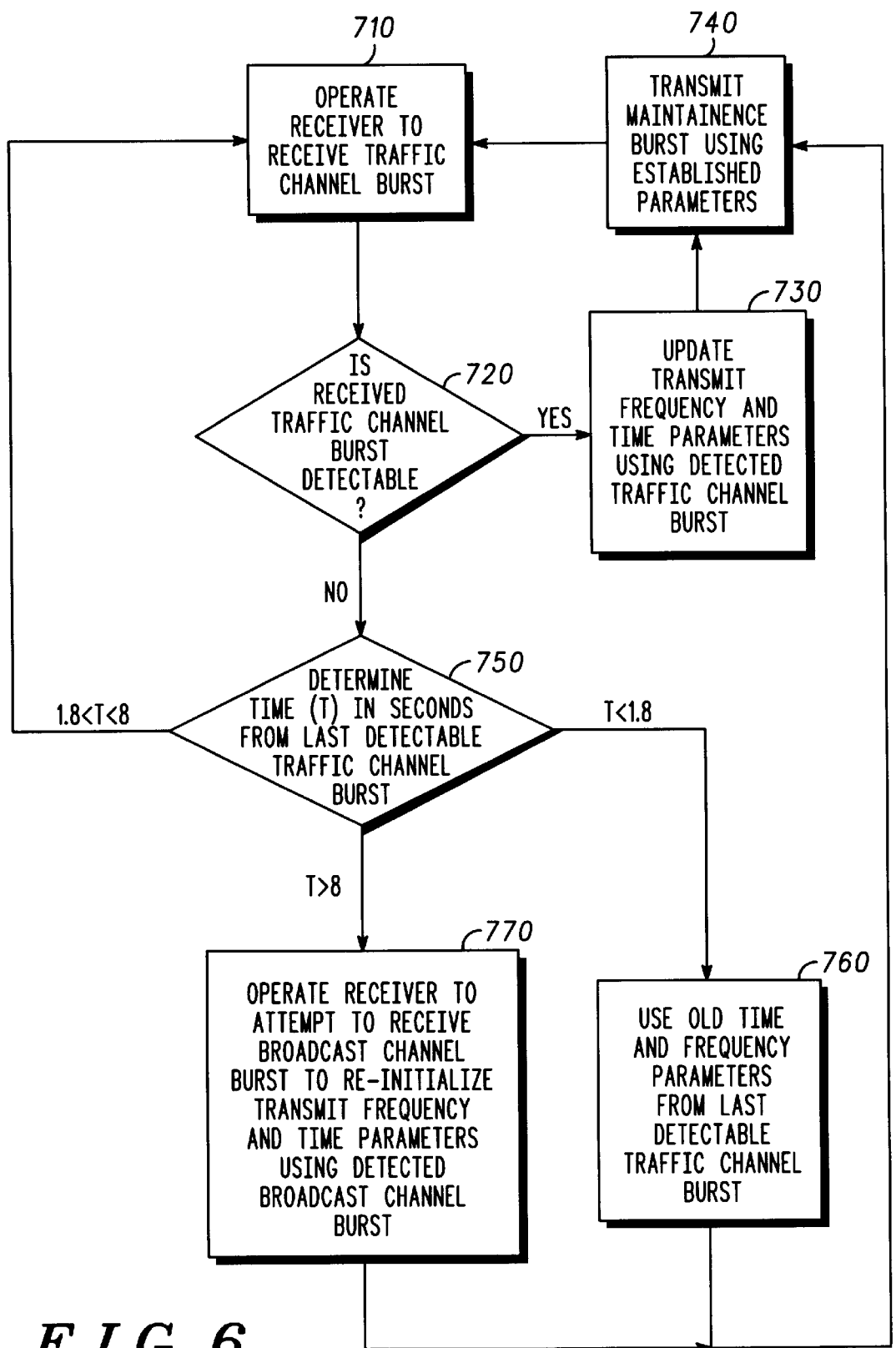
FIG. 6 illustrates a flow chart for surviving fade conditions.

FIG. 6 illustrates a flow chart. Beginning at step 710, the receiver is operated to receive a burst on the traffic channel. Should the burst be detectable, flow proceeds to step 720 where the frequency and time parameters are updated based on the detected burst in step 730 and thereafter in step 740 a transmit or maintenance burst is transmitted using the established parameters. On the other hand, should the received burst be undetectable in step 720, then a length of time (T) in a counter since the last detectable traffic channel burst is determined in step 750. If the length of time (T) elapsed from the last detectable traffic channel burst is less than 1.8 seconds, then the old time and frequency parameters are assumed valid in step 760 and can be used by the transmitter to transmit a burst in step 740. On the other hand, should the length of time (T) elapsed from the last detectable burst be greater than 1.8 seconds, but less than 8 seconds as determined by step 750, then the receiver returns to step 710 and attempts to receive more bursts. During this period, the transmitter does not transmit because the synchronization parameters such as frequency and time parameters could result in a transmit frequency and time that are outside the tolerance of the receiver of the base station or satellite. Nevertheless, the receiver of the transceiver is more frequency and time tolerant than the receiver of the base station or satellite. The transmitter of the transceiver thus needs to have more accurate synchronization parameters than the receiver of the transceiver. Thus the transmitter in the preferred embodiment requires synchronization parameters twice as accurate as the synchronization parameters of the transmitter.

Should the length of time (T) elapsed since the last detectable burst exceed a long time period of 8 seconds, then the receiver is operated in step 770 to receive a broadcast frame on the broadcast channel to re-initialize synchronization parameters such as the frequency and time parameters and thereafter the transmitter can transmit in step 740.

Although the invention has been described and illustrated in the above description and drawings, it is understood that this description is by example only, and that numerous changes and modifications can be made by those skilled in the art without departing from the true spirit and scope of the invention. Although the present invention is specifically applicable to transceivers in fast-moving aircraft and communication with satellites, the present invention provides advantages in less velocity-hostile environments such as typical cellular, paging and land mobile radio applications.

What is claimed is:

1. A method of maintaining synchronization through fade conditions in a time-framed communications system, the method comprising the steps of:
    (a) intermittently operating a receiver of a time-framed communications transceiver to receive received bursts;
    (b) checking if the received bursts are detectable;
    (c) if one of the received bursts checked in step (b) is detectable, extracting synchronization parameters from the received burst, storing the synchronization parameters in memory and resetting a counter;
    (d) if a received burst is undetectable, determining if the counter has not exceeded a predetermined short time period and determining if previous synchronization parameters were stored in step (c) in the memory;
    (e) if both of the determinations in step (d) are affirmative, in transmitter of the time-framed communications transceiver, transmitting a transmit burst to a remote station based on the stored synchronization parameters; and
    (f) if the received burst is undetectable for a predetermined long time period, operating the receiver to receive a received burst from another channel of the system having frames with a longer synchronization portion than a present channel, extracting synchronization information from a detectable received burst to re-establish synchronization parameters, and transmitting the transmit burst to the remote station based on the re-established synchronization parameters.

2. A method according to claim 1, wherein the predetermined short time period is a length of time an intolerable amount of variation in frequency and of variation in frame arrival time would cause loss of synchronization of the transmitter of the time-framed communications transceiver with a receiver of the remote station.

3. A method according to claim 2, wherein the predetermined short time period is approximately 1.8 seconds.

4. A method according to claim 1, wherein the predetermined long time period is a length of time an intolerable amount of variation in frame arrival time and of variation in frequency would cause loss of synchronization with a transmitter of the remote station.

5. A method according to claim 4, wherein the predetermined long time period is approximately 8 seconds.

6. A method according to claim 1, wherein the receiver of the time-framed communications transceiver is more tolerant to drift in the synchronization parameters than the transmitter of the time-framed communications transceiver.

7. A method according to claim 1, further comprising the step of if a received burst is undetectable, then again operating the receiver of the time-frame communications transceiver to attempt to receive a detectable received burst in order to transmit the transmit burst.

8. A method according to claim 1, wherein if the received burst is detectable, then extracting synchronization parameters from the received burst and transmitting the transmit burst to the remote station based on the extracted synchronization parameters.

9. A method according to claim 1, wherein the received burst is received on a traffic channel and the transmit burst is transmitted on the traffic channel.

10. A method according to claim 1, wherein the transmitter of the time-framed communications transceiver is synchronized to a receiver of the remote station using the synchronization parameters received from the remote station by the time-framed communications transceiver.

11. A method according to claim 1, wherein the transmit burst maintains synchronization of the transmitter of the time-frame communications transceiver with a receiver of the remote station to avoid dropping of a call.

12. A method according to claim 1, wherein the synchronization parameters comprise both transmitter frequency and frame timing parameters.

13. A time-framed communications transceiver apparatus for maintaining synchronization through fade conditions in a time-framed communications system, the apparatus comprising:
    a receiver for receiving bursts and checking if received bursts are detectable;
    a memory for storing synchronization parameters;
    a counter for counting after detection of a received burst;
    a burst synchronizer operatively coupled to the receiver, the memory and the counter to extract synchronization parameters from the received burst, store the synchronization parameters in the memory and reset the counter when a received burst is detectable;
    a transmitter operatively coupled to the burst synchronizer, the memory and the counter to transmit a transmit burst to a remote station based on the stored synchronization parameters both if the counter has not exceeded a predetermined short time period and if previous synchronization parameters were stored in the memory when a received burst is undetectable;

wherein after a burst is undetectable for a predetermined long time period, the receiver receives a received burst from another channel of the system having frames with a longer synchronization portion than a present channel and the burst synchronizer extracts synchronization information from a detectable received burst to re-establish synchronization parameters; and wherein the transmitter transmits the transmit burst to the remote station based on the re-established synchronization parameters.

14. An apparatus according to claim 13, wherein the predetermined short time period is a length of time an intolerable amount of variation in frequency and of variation in frame arrival time would cause loss of synchronization of a receiver of the remote station.

15. An apparatus according to claim 13, wherein the predetermined long time period is a length of time an intolerable amount of variation in frame arrival time and of variation in frequency would cause loss of synchronization with a transmitter of the remote station.

16. An apparatus according to claim 13, wherein the receiver of the time-framed communications transceiver is more tolerant to drift in the synchronization parameters than the transmitter of the time-framed communications transceiver.

17. A time-framed communications transceiver apparatus for maintaining synchronization through fade conditions in a time-framed communications system, the apparatus comprising:

a receiver for receiving bursts on a traffic channel and checking if received bursts are detectable;

a memory for storing synchronization parameters;

a counter for counting after detection of a received burst;

a burst synchronizer operatively coupled to the receiver, the memory and the counter for, when a received burst is detectable, extracting synchronization parameters from the received burst, storing the synchronization parameters in the memory and resetting the counter and for, after a burst is undetectable for a first predetermined time period, receiving and detecting a burst from a broadcast channel of the system having frames with a longer synchronization portion than the traffic channel and re-extracting synchronization information therefrom to re-establish synchronization parameters; and a transmitter, more tolerant to drift in synchronization parameters than the receiver, operatively coupled to the burst synchronizer, the memory and the counter for transmitting a transmit burst to a remote station based on a synchronization if both the counter has not exceeded a second predetermined time period and previous synchronization parameters were stored in the memory when a received burst is undetectable or if synchronization parameters have been re-established after the first predetermined time period.

* * * * *